Figure 1:
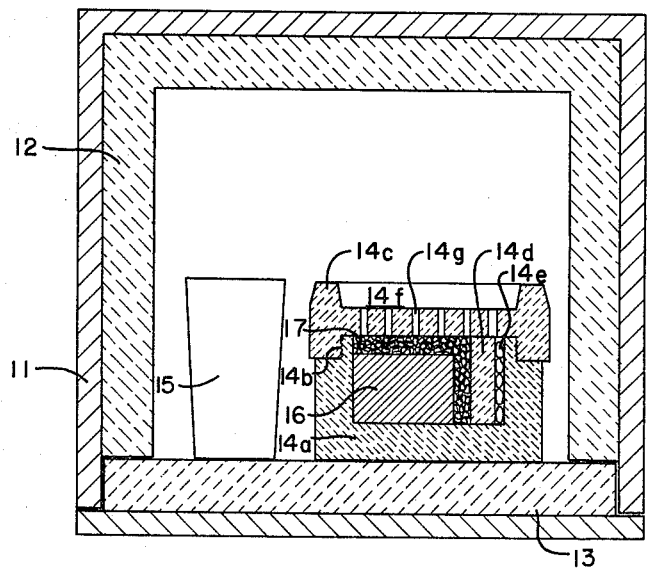

March 30, 1965 H. C. BRIDWELL ETAL 3,175,260
PROCESS FOR MAKING METAL CARBIDE HARD SURFACING
MATERIAL AND COMPOSITE CASTING
Filed Sept. 6, 1961 2 Sheets-Sheet 1

HAROLD C. BRIDWELL
DAVID S. ROWLEY   INVENTORS

BY *James E. Reed*
ATTORNEY

United States Patent Office 3,175,260
Patented Mar. 30, 1965

3,175,260
PROCESS FOR MAKING METAL CARBIDE HARD SURFACING MATERIAL AND COMPOSITE CASTING
Harold C. Bridwell and David S. Rowley, Tulsa, Okla., assignors to Jersey Production Research Company, a corporation of Delaware
Filed Sept. 6, 1961, Ser. No. 136,308
13 Claims. (Cl. 22—202)

The present invention relates to materials for hard surfacing drill bits and similar tools and more particularly relates to a process for making an improved hard surfacing material composed of particles of hard metal carbide supported within a metal matrix softer and more ductile than the carbide.

Hard surfacing materials containing particles of cemented tungsten carbide or a cemented tungsten carbide alloy supported in a matrix of softer, more ductile metal have been used in the past for protecting surfaces normally subjected to severe abrasion and erosion. Such materials are generally applied by placing the tool to be hard surfaced in a refractory mold, positioning carbide particles in the mold in contact with the tool surface, adding pellets of the matrix metal to the mold, and thereafter heating the mold and its contents to a temperature sufficient to melt the pellets. As the matrix metal melts, it flows into the interstices between the carbide particles and the tool surface. The mold is then removed from the furnace and allowed to cool. Solidification of the matrix metal results in the bonding of the particles to the tool. Hard surfacing materials produced in this manner are normally superior to those produced by other processes but are not entirely satisfactory for all purposes. Experience has shown that cemented carbide particles bonded to oil field drill bits and similar tools with a matrix of softer metal may be destroyed in a relatively short time. The stresses to which the hard surfacing materials on such a tool are subjected are much higher than those encountered in many other applications and hence a material having exceptional strength and hardness is required. The process described above generally does not produce such a material.

The difficulties encountered in the past with hard surfacing materials containing cemented carbide particles are due in part to inherent properties of the cemented hard metal carbides. Such carbides are normally produced by compacting a mixture of powdered carbide and cobalt at high pressure and then sintering the compacted mixture at a temperature near the melting point of cobalt. The product consists of a skeleton of interconnected carbide grains containing a continuous cobalt phase. When a particle of this material is contacted at high temperature with a molten matrix metal having the ability to wet the carbide, an alloy of the matrix metal and cobalt is formed. Earlier work has indicated that this alloy furnishes the metallurgical bond between the particles and matrix. The cobalt in the particle is in part replaced by matrix metal which diffuses into the spaces between the interconnected carbide grains and holds the particle in place. This displacement of cobalt results in the formation of a "reaction rim" or "halo" which extends inwardly from the surface of the particle. Microhardness tests and other metallurgical work have shown that this halo is much softer and considerably weaker than the unaltered center or "core" of the particle and that this change in particle structure is largely responsible for the poor performance obtained with hard surfacing materials prepared in the manner described earlier. Because of the apparent relationship between the formation of a cobalt-matrix alloy and the bonding of cemented carbide particles in place within the matrix, degradation of the particles has been considered unavoidable.

It is therefore an object of the present invention to provide a process for the production of improved hard surfacing materials which are considerably stronger and more resistant to abrasion and erosion than materials available heretofore. A further object of the invention is to provide a process for the bonding of cemented hard metal carbide particles within a matrix of softer, more ductile metal which does not result in substantial degradation of the cemented carbide. Other objects will become apparent as the invention is described in greater detail hereafter.

In accordance with the present invention, it has now been found that improved hard surfacing materials containing hard metal carbide particles supported in a matrix of softer, more ductile metal can be prepared by infiltrating the matrix metal into the interstices between the carbide particles under carefully controlled conditions. Studies and laboratory work have demonstrated that metallurgical bonding of hard metal carbide particles within a matrix of softer metal having the ability to wet the carbide does not depend upon the replacement of large quantities of the cobalt by the matrix metal and that the infiltration process used to produce hard surfacing materials containing such particles can therefore be controlled to minimize alloying between the matrix metal and cobalt without sacrificing the strength contributed by a metallurgical bond. Moreover, it has been found that proper control of the infiltration conditions results in a hardening rather than a softening of the carbide particles. This makes possible the production of hard surfacing materials containing cemented carbide particles which have exceptional strength and hardness. Such materials have considerably greater resistance to abrasion and erosion than hard surfacing materials available in the past.

In carrying out the process of the invention, particles of cemented tungsten carbide or tungsten carbide alloy and a quantity of matrix metal sufficient to fill the interstices between the particles are separately heated to the required infiltration temperature in an electric furnace. After the requisite temperature has been reached, the molten matrix metal is poured from the crucible or other vessel in which it was heated into the mold containing the particles. The mold is then held at the infiltration temperature long enough to permit reaction of the matrix metal at the surfaces of the carbide particles. At the end of this reaction period, the mold is removed from the furnace and rapidly cooled to a temperature below the matrix melting point. Experimental work has shown that thus preventing premature contact between the molten matrix and carbide particles, limiting the furnacing time, and quickly cooling the mold following infiltration results in hardening of the particles and permits the formation of a strong metallurgical bond without serious degradation of the particle structure.

Figure 2:
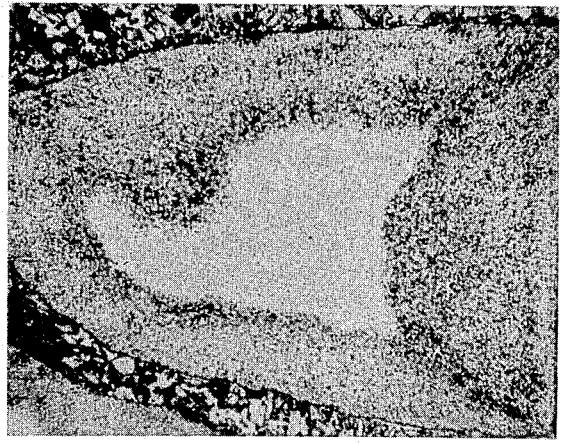
Figure 3:
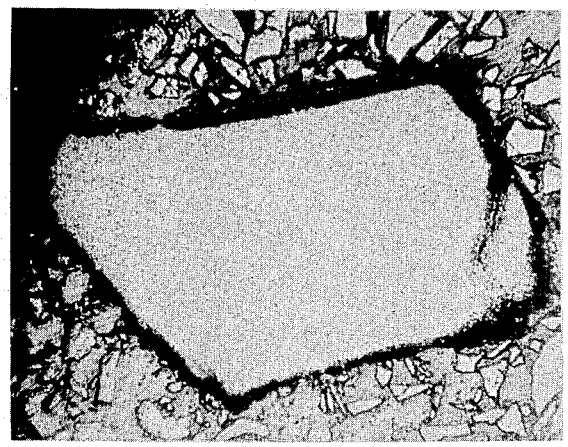

The nature and objects of the invention can be better understood by referring to the following detailed description of the improved process and to the accompanying drawing, in which:

FIGURE 1 represents schematically a vertical section through an electric furnace containing a mold and crucible suitable for use in the preparation of the hard surfacing material of the invention;

FIGURE 2 is a reproduction of a photomicrograph showing a cemented tungsten carbide particle partially destroyed by the formation of an alloy between the cobalt in the particle and the surrounding matrix metal; and, FIGURE 3 is a reproduction of photomicrograph showing a cemented tungsten carbide particle which has been metallurgically bonded in place within a matrix of softer metal without the formation of a cobalt-matrix alloy in significant quantities.

The process of the invention may be carried out in an electric furnace of either the resistance or the induction type. Reference numeral 11 in FIGURE 1 of the drawing designates a bottom-loading electric furnace of the resistance type lined with refractory 12 and provided with a door 13 which is opened and closed by raising and lowering it. A furnace of this type is generally preferred for purposes of the invention because of the relatively small temperature drop which takes place when the furnace is opened. Reference numeral 14 designates the mold employed to hold the cemented carbide particles to be infiltrated with the molten matrix metal; while reference numeral 15 indicates the crucible in which the matrix metal is melted.

The refractory mold employed in preparing the hard surfacing material of the invention will normally include a lower mold section 14a provided with threads 14b for attaching an upper section or cover 14c. The lower section contains a recess within which the hard metal carbide particles and the tool or part to which they are to be bonded may be placed. The shape of this recess will depend upon the desired configuration of the finished tool. It should be designed to accommodate the tool so that the surfaces to which the carbide particles are to be bonded are readily accessible. Sufficient space must be left adjacent the surfaces to permit addition of the required carbide particles. It is generally preferred to machine a large recess in the lower section of the mold and then insert spacers 14d of refractory material to obtain a smaller recess of the desired shape. Sand, strips of clay, or similar material 14e may be placed between the spacers and the mold wall to allow for thermal expansion as the mold contents are heated. The mold cover contains a depression 14f and ports 14g extending through the cover into the recess below. One port for each square inch of tool surface to which carbide particles are to be bonded will generally be satisfactory. The mold may be made of carbon or a refractory ceramic material. The use of a carbon mold is preferred because of the ease with which carbon blocks can be machined to form the mold parts and because the carbon assures a reducing atmosphere during infiltration.

After a suitable mold has been prepared, it should be preheated to drive off any water present and then allowed to cool. A blast of clean air free from oil may be used to remove dust from the mold parts. If a carbon mold is utilized, the mold recess should be lined with "Fiberfrax" or a similar asbestos material at points where the tool or part 16 to be hard surfaced would otherwise contact the carbon. This prevents carburization of the tool steel at the temperatures required for infiltration. The faces of the tool to be hard surfaced are preferably serrated, grooved or center punched with an air hammer to provide better bonding between the steel and matrix metal. The tool is then cleaned with dilute nitric acid followed by alcohol, dried, and positioned in the mold recess. The cemented carbide particles 17 to be bonded in place are cleaned in similar fashion and added to the mold.

The cemented hard metal carbide particles employed in accordance with the invention are particles of cemented tungsten carbide or cemented particles of a mixed carbide including a small amount of titanium carbide, tantalum carbide, niobium carbide or the like in addition to the tungsten carbide. Such cemented carbides normally contain from about 1% to about 25% of cobalt or a cobalt alloy including a small amount of iron or nickel as the cementing agent. Carbides having very low cementing metal contents are often quite brittle; while those containing the cementing metal in large quantities are frequently excessively soft. The use of cemented tungsten carbide containing from about 4% to about 12% cobalt is normally preferred because of its high strength and extreme hardness. The size of the carbide particles employed will normally range between about 0.045 inch and about 0.400 inch along their major dimension. For rotary drill bits and similar tools, particles of between about 0.050 inch and about 0.250 inch are preferred. Carbide particles of suitable size are commercially available in various forms. Angular chips produced by fracturing larger pieces of carbide will normally be used but in some cases particles of regular shape, cubes for example, may be employed.

The hard metal carbide particles 17 are generally packed into the mold voids in random fashion. If shaped particles are used, however, it may be desirable to orient the particles in layers by gluing or otherwise affixing them to the mold or the mold inserts. Subsequent infiltration of matrix metal into the spaces surrounding the oriented particles will result in their being bonded in place. Diamonds may be mounted in similar manner in order to augment the cutting action or reduce wear at critical points on a rotary drill bit or similar tool hard surfaced in accordance with the invention.

Powdered hard metal carbide, not shown in the drawing, is preferably placed in the mold voids with the hard metal carbide particles in preparing the hard surfacing material. The composition of the powdered carbide thus used may be identical to that in the carbide particles. Instead, a powdered carbide having somewhat different properties, one which is harder but more brittle for example, may be utilized. The powder should be screened to pass a 100 mesh or smaller Tyler screen. It is preferred to utilize powder of 170 mesh or smaller size. From about 5 to about 35 weight percent of powdered nickel, based on the total powder employed, will preferably be ball-milled with the powdered carbide and added to the mold in order to promote wetting of the carbide powder by the matrix metal. Where a matrix metal having a very high nickel content is employed, addition of the powdered nickel may in some cases be omitted. The powder should be washed with dilute nitric acid and alcohol or similar solvents and then dried in order to remove dirt, grease and other foreign material. The mold may be vibrated as the powder and cutting elements are added in order to form a dense, closely-packed mass in the voids adjacent the tool surfaces. Instead, the mold may be pressed at a pressure of from 100 to 200 pounds per square inch to pack the particles and powder in place. Excessive vibration sufficient to cause separation or gradation of the powder should be avoided. After the mold has been carefully filled with the carbide powder and cemented carbide particles, the mold cover 14c is threaded onto lower mold section 14a and tightened down. The mold may be placed in a press to assist in tightening the cover if necessary.

Following assembly of the mold, pellets of matrix metal are placed in crucible 15. The metal employed to form the matrix should be capable of wetting the hard metal carbide particles in the molten state and should have a melting point between about 1550° F. and about 2400° F. Suitable metals include copper-nickel alloys, copper-nickel-tin alloys, copper-nickel-iron alloys, iron-nickel-carbon alloys, copper-cobalt-tin alloys, copper-nickel-iron-tin alloys, copper-nickel-manganese alloys, and the like. Such alloys may contain minor amounts of other metals including zinc, manganese, molybdenum, iron, silicon, beryllium, bismuth, boron, cadmium, cobalt and phosphorus. S Monel and a number of other commercially available alloys which melt within the above specified temperature range and will wet the carbide and steel may be utilized for purposes of the invention and will be familiar to those skilled in the art. It will be understood, of course, that every alloy has slightly different properties and that certain alloys are therefore more effective for purposes of the invention than are others. The use of copper-nickel-tin or copper-nickel-manganese alloys is preferred because of their excellent wetting characteristics and high strength. A small amount of borax or other flux may be added to the matrix metal pellets in crucible 15 in order to aid in the control of oxide formation at elevated temperatures.

It is preferred that the assembled mold 14 containing the tool 16, the carbide particles 17, and the carbide powder be preheated at a temperature between about 300° and about 600° F. for an hour or longer in order to eliminate gases from the mold which might otherwise cause oxidation at the infiltration temperature. Following this preheating step, the mold and the crucible 15 containing the matrix metal are placed in an electric furnace and heated to a temperature between about 1750° F. and about 2500° F. The temperature employed should not greatly exceed that required for rapid infiltration of the matrix metal into the carbide particles and powder. The composition of the matrix metal and the powder in the mold will govern the infiltration tempertaure. Copper-nickel alloys will readily infiltrate at temperatures between about 2000° F. and about 2250° F.; whereas slightly higher temperatures are required for the infiltration of iron-nickel-carbon alloys and the like. The use of powdered nickel in the mold promotes wetting of the carbide powder and generally permits the use of a slightly lower infiltration temperature than might otherwise be necessary. The precise temperature required for a particular matrix alloy and powder can readily be determined by preparing small specimen molds, filling them with carbide particles and powder, pouring the molten matrix metal into them at various temperatures, and later examining the specimens to determine whether infiltration took place.

After the furnace has returned to temperature following the insertion of mold 14 and crucible 15, the mold and crucible are heated for a period of from about 30 minutes to an hour or more in order to melt the matrix metal and bring the contents of the mold up to the infiltration temperature. The time required to reach this temperature will depend upon the type of furnace utilized and upon the size and heat transfer characteristics of the mold. Heating of the cemented carbide particles in the absence of the matrix metal prevents degradation of the particles before the temperature required for complete infiltration is reached. The mold contents can be held at elevated temperatures for long periods prior to infiltration without adverse effects. After sufficient time for the particles to have reached the infiltration temperature has elapsed, the furnace door 13 is opened. The crucible 15 is quickly lifted with a pair of long-handled tongs or a similar tool and the molten matrix metal is poured into the mold. This step should be carried out as rapidly as possible in order to minimize cooling of the mold and furnace while the door is open. The door is then closed and heating is continued for a period of from about three minutes to about six minutes. During this period, the molten matrix metal flows into the interstices between the carbide particles, the mold and the tool to be hard surfaced. Reaction of the matrix with the carbide at the surfaces of the particles takes place. Some diffusion and alloying of the matrix metal with the cobalt at the surface of the particles will also occur but the extent to which this takes place is limited. Studies have shown that much of the alloying and resultant carbide degradation which occurs in the conventional infiltration process occurs before the final temperature required for complete infiltration is reached. Separate heating of the particles and matrix metal to the infiltration temperature avoids this.

Following the three to six minutes infiltration period, the mold 14 is taken out of the furnace and quickly cooled to a temperature between about 1500° F. and about 1600° F within a period of from one to five minutes. The method utilized to cool the mold will depend primarily upon the mold size. In the case of relatively large molds, those a foot or more in diameter for example, a water spray should be used to assure cooling at a sufficiently rapid rate. With smaller molds, an air blast will usually be adequate. An optical pyrometer may be used to check mold temperatures if desired. Rapid cooling below about 1500° F. should be avoided because such cooling may have an adverse effect upon the grain structure of the steel in the tool. The mold is therefore allowed to cool slowly from about 1500° to 1600° F. down to room temperature in still air. This two stage cooling cycle assures prompt arrest of the cobalt-matrix interaction responsible for halo formation and yet permits the formation of a strong metallurgical bond between the cemented carbide particles, the matrix and the steel surface. Thereafter, the tool may be removed from the mold and sand blasted, machined or ground to remove surface irregularities. The finished tool will have a hard surface consisting essentially of hard metal carbide particles securely supported by a discontinuous skeletal structure of carbide powder and a matrix of softer metal.

The process of the invention is not restricted to the bonding of cemented hard metal carbide particles and a matrix to a tool or similar article as described above and may instead be employed to form hard metal pads or inserts which can later be brazed to the surface of a tool or other piece of equipment. The procedure employed is identical to that set forth in the preceding paragraph except that the carbide particles are placed in a suitable mold and infiltrated in the absence of the tool or other article. The pads or inserts thus produced can subsequently be bonded in place with a brazing metal. An alternate bonding technique involves the tinning of the tool surface and the use of a torch to melt the matrix at the surface of the pad or insert in contact with the tinned surface. Pads or inserts may also be formed on steel plates by infiltration, using the techniques earlier described, and later affixed to a tool or other piece of equipment by welding the steel plates in place. These methods are particularly useful for the hard surfacing of very large pieces of equipment which cannot readily be placed in a mold.

The advantages of the process of the invention are illustrated by the results of experimental work carried out to test the bonding of cemented hard metal carbide particles within matrices of softer metal.

In a first series of tests, hard metal specimens were prepared by infiltrating hard metal carbide particles and powder with a molten copper-nickel-tin alloy in carbon molds. The carbide particles employed were angular fragments of a commercially available cemented tungsten carbide containing 90.0 weight percent monotungsten carbide and 10.0 weight percent cobalt as the cementing metal. The hardness of these particles ranged between about 88.8 and 89.0 on the Rockwell A scale. The particles were screened to eliminate fragments smaller than 0.125 and greater than 0.187 inch in size, were thoroughly cleaned, and were placed in clean dry carbon molds. A mixture containing 83 weight percent of cast tungsten carbide powder and 17 weight percent of nickel was ball-milled and screened to obtain a product of minus 170 mesh size. This powder was placed in the molds with the carbide particles. The molds were vibrated to obtain closely-packed mixtures of the particles and powder. In one case pellets of a matrix alloy containing about 35 weight percent copper, about 55 weight percent nickel and about 10 weight percent tin were placed in a recess in the mold cover in the conventional manner. In the other case, pellets of the same matrix alloy were placed in a separate clay crucible.

The mold containing the carbide particles, powder and matrix metal was placed in an electric furnace at a temperature of 2250° F. and heated until the matrix metal in the mold recess had melted and flowed down into the particles and powder below. The mold was held in the furnace for a period of 20 minutes after fusion of the pellets to permit bonding of the particle in place.

Thereafter, the mold was removed from the furnace and allowed to cool under atmospheric conditions.

The mold containing the particles and powder was preheated and the mold and clay crucible were then placed in the furnace at 2250° F. After the pellets of matrix alloy in the crucible had melted and the mold contents had reached the 2250° F. infiltration temperature, the molten alloy was quickly poured from the crucible into the mold with a pair of long handled tongs. The mold was held at the infiltration temperature for a period of 4 minutes and was then removed from the furnace and cooled with a water spray for one and a half minutes. At the end of this initial cooling period, the matrix alloy had solidified and the mold temperature had dropped to about 1550° F. The mold was then allowed to cool to room temperature in still air.

Samples of the two materials prepared as described above were mounted in plastic specimen holders, polished, and etched to bring out the structure of the carbide particles. Each specimen was then examined under a metallographic microscope. FIGURE 2 in the drawing is a reproduction of a photomicrograph showing a cemented carbide particle in the material prepared by heating the particles, powder and pellets together and then later cooling the mold. The light colored area at the center of the photomicrograph is the essentially unaltered core of the cemented carbide particle. Surrounding this core is a gray halo area composed of altered cemented tungsten carbide. The boundaries of the halo area are clearly visible. The carbide particle is surrounded by matrix metal containing partially dissolved tungsten carbide powder. In the lower left-hand corner of the photomicrograph is a portion of a second cemented particle which also contains a halo. The thickness of the halo in the particle shown in FIGURE 2 ranges from about 9 to about 25 thousandths of an inch. The plane on which the photomicrograph was taken extends through the approximate center of the cemented carbide particle and hence it can be seen that at least 50% of the original particle was altered in structure by the reaction responsible for formation of the halo.

FIGURE 3 of the drawing is a reproduction of a photomicrograph showing a cemented tungsten carbide particle in the material prepared by heating the particles and matrix alloy separately, pouring the molten alloy into the mold, and thereafter quickly cooling the mold to a temperature below the matrix melting point. The photomicrographs represented in FIGURES 2 and 3 were both taken at 60 power magnification. It can be seen that the appearance of the particle shown in FIGURE 3 is quite different from that of the particle in FIGURE 2. The light center section representing essentially unaltered tungsten carbide is only slightly smaller than the original particle. A thin band of dark material caused by reaction between the carbide, cobalt and matrix surrounds the particle and bonds it in place. The matrix metal containing partially dissolved carbide powder can be seen at the edges of the photomicrograph. These photomicrographs demonstrate that the process of the invention results in significantly less alteration of the cemented carbide than does the earlier process and that the final product is structurally different from that obtained in the conventional process.

Following the test described above, microhardness measurements were made to determine the effect of carbide-matrix interaction on the properties of the cemented carbide. The measurements were carried out with a Vickers microhardness tester. Hardness determinations were made at intervals across a series of cemented tungsten carbide particles similar to that shown in FIGURE 2 of the drawing. In every case it was found that the halo section at the periphery of the cemented carbide particle was significantly softer than the core of the particle. The results of a typical test are shown in Table I below.

TABLE I

*Diamond pyramid hardness measurements across a cemented tungsten carbide particle*

| Reading No. | Location on Particle | Diamond Pyramid Hardness |
|---|---|---|
| 1 | Near edge | 920 |
| 2 | ---------- | 885 |
| 3 | ---------- | 840 |
| 4 | ---------- | 850 |
| 5 | ---------- | 785 |
| 6 | ---------- | 860 |
| 7 | ---------- | 1,550 |
| 8 | Center | 1,550 |
| 9 | ---------- | 1,640 |
| 10 | ---------- | 1,580 |
| 11 | ---------- | 1,640 |
| 12 | ---------- | 1,550 |
| 13 | ---------- | 960 |
| 14 | ---------- | 1,050 |
| 15 | ---------- | 1,065 |
| 16 | Near edge | 1,150 |

The values in the above table, obtained at intervals of 0.1 millimeter across the particle surface under a 200 gram load, clearly show the effect of halo formation upon the properties of the cemented tungsten carbide. Near the center of the particle, hardness values between 1550 and 1640 were obtained. These correspond to the initial hardness and indicate that the carbide in this central region was not degraded. Near the edges, however, the hardness values dropped sharply. The lower values obtained show that there was a significant change in carbide structure near the edges of the particle. The boundaries of the halo are clearly delineated by the differences between readings 6 and 7 and between readings 12 and 13. It can be seen that the halo was about six-tenths of a millimeter wide on one edge, that the core had about the same width, and that the halo width on the other edge was about four-tenths of a millimeter. The data thus show that a substantial portion of the original carbide was rendered much softer as a result of the halo formation. These soft portions are much less resistant to abrasion and erosion than the original carbide.

Microhardness tests similar to those described above were carried out with a Knoop microhardness tester on a cemented carbide particle bonded in place by the process of the invention. The particle used was similar to that shown in FIGURE 3 of the drawing. The data obtained are set forth in the following table.

TABLE II

*Knoop hardness measurements across a cemented tungsten carbide particle*

| Reading No. | Location on Particle | Knoop Hardness |
|---|---|---|
| 1 | Near edge | 1,257 |
| 2 | ---------- | 1,332 |
| 3 | ---------- | 1,312 |
| 4 | Near Center | 1,342 |
| 5 | ---------- | 1,257 |
| 6 | ---------- | 1,244 |
| 7 | ---------- | 1,257 |
| 8 | Near edge | 1,222 |
| 9 | ---------- | 1,124 |

The hardness values set forth in the above table indicate that substantial degradation of the cemented carbide structure did not take place during preparation of the hard surfacing material. The effective volume of the particle from the standpoint of resistance to abrasion and erosion was not materially reduced. Moreover, an increase in hardness from the original value of 1287 to a value of 1342 occurred near the center of the particle. The process of the invention thus results in a material in which the carbide particles are harder and have greater over-all strength than those in materials available heretofore.

Further tests were carried out by preparing a series of small samples of hard surfacing material containing tungsten carbide particles under conditions such that the total time during which the carbide particles were exposed to the matrix metal at temperatures above the matrix melting point could be accurately measured. Both cemented and cast tungsten carbide particles and a variety of matrix alloys were used in preparing the specimens. A sample of each specimen was then prepared and examined under the microscope to determine the extent to which halo formation had occurred. The results are set forth in Table III below.

TABLE III

*Halo formation in small specimens*

| Run Number | Tungsten Carbide [1] Particle Composition | Powder [2] Composition | Matrix [3] Alloy Composition | Total Alloy-Particle Contact Time at Temperatures above the Alloy Melting Point, Minutes | Halo Width, Millimeters |
|---|---|---|---|---|---|
| 1 | $S_1$ | None | None | None | None. |
| 2 | $S_1$ | $P_1$ | None | None | None. |
| 3 | $S_1$ | $P_1$ | $A_1$ | 5 | 0.079. |
| 4 | $S_1$ | $P_1$ | $A_1$ | 7 | 0.127. |
| 5 | $S_1$ | $P_1$ | $A_1$ | 15 | 0.180. |
| 6 | $S_1$ | $P_1$ | $A_1$ | 60 | 0.760. |
| 7 | $C_1$ | $P_1$ | $A_1$ | 15 | None. |
| 8 | $S_1$ | $P_2$ | $A_2$ | 5 | 0.058. |
| 9 | $S_1$ | $P_2$ | $A_2$ | 15 | 0.203. |
| 10 | $S_1$ | $P_2$ | $A_2$ | 60 | 0.305. |
| 11 | $S_2$ | $P_2$ | $A_2$ | 15 | 0.089. |
| 12 | $S_1$ | $P_3$ | $A_2$ | 15 | 0.155 |
| 13 | $S_1$ | $P_3$ | $A_3$ | 60 | 0.404. |
| 14 | $S_1$ | $P_4$ | $A_3$ | 15 | 0.231. |

[1] $S_1$=cemented carbide, 90% WC–10% Co. $S_2$=cemented carbide, 94% WC–6% Co. $C_1$=cast carbide, 95.67%–3.85% C–0.08% Co–0.08% Fe–0.05% Cb–0.05% Ta–0.20% Mo–0.01% Cu–0.01% Al.
[2] $P_1$=83% WC–17% Ni. $P_2$=90% WC–10% Ni. $P_3$=100% WC. $P_4$=85% WC–10% Ni–5% W.
[3] $A_1$=35% Cu–55% Ni–10% Sn. $A_2$=53% Cu–37% Ni–10% Zn. $A_3$=90% Cast Iron–10% Ni.

The data obtained in Runs 1 through 6 in Table III clearly illustrate that halo formation is caused by interaction between the matrix alloy and the cobalt in the cemented carbide structure. In Run 1, cemented tungsten carbide particles were heated in the absence of both powder and alloy. No halo was formed. Similar results were obtained in Run 2 where the particles were heated in the presence of a mixture of powdered carbide and nickel without the matrix alloy. In Runs 3 through 6, however, the matrix alloy was present and halo formation occurred. It can be seen that the halo increased with increasing exposure of the particles to the alloy at elevated temperatures. The sixty minute exposure period in Run 6 approximates the total exposure time when a large mold containing a steel tool, carbide particles, powder and matrix is heated for a long period or is removed from the furnace after a short infiltration period and allowed to cool in still air. If excessive halo formation is to be avoided, the infiltration period and the cooling rate must be controlled.

Run 7 in Table III was carried out with cast tungsten carbide particles containing only a trace of cobalt. It will be noted that no halo formation occurred. This indicates that it is the cobalt contained in the pores of the sintered carbide structure which is responsible for halo formation and not the tungsten carbide itself. The cast tungsten carbide particles were securely held in place by a metallurgical bond, showing that severe halo formation is not essential to the metallurgical bonding of the carbide particles in the matrix.

Runs 8 through 14 in Table III were carried out with two different types of cemented tungsten carbide, three different powder compositions and two different matrix alloys of widely varying properties. In each case a metallurgical bond between the carbide particles and the matrix was formed. The effect of total contact time between the particles and the molten alloy on halo formation is apparent.

To further demonstrate the process of the invention, two sets of steel oil field drag bit blades were hard surfaced. Both sets of blades were produced by infiltrating angular cemented tungsten carbide particles and a minus 170 mesh mixture of 83 weight percent powdered tungsten carbide and 17 weight percent nickel with an alloy containing about 35 percent copper, about 55 percent nickel and about 10 percent tin at 2250° F. In one case carbide particles and powder in contact with the steel blades were infiltrated with the matrix alloy in the conventional manner, the mold used was held at the infiltration temperature for approximately 20 minutes, and the blades were then allowed to air cool to room temperature. The second set of blades was prepared by heating the powder and carbide particles in contact with the steel blades in a carbon mold, separately melting the matrix alloy in a crucible, pouring the molten alloy into the mold, holding the mold to the infiltration temperature of 2250° F. for 4 minutes, water cooling the molds to about 1600° F., and thereafter allowing the blades to cool to room temperature under atmospheric conditions. Metallographic examination showed that the carbide particles in the blades prepared in the conventional manner had halos of about 0.015 inch and that about 50 to 75 percent of the total carbide particle volume in the blades had been degraded by halo formation during fabrication of the blades. The carbide particles in the blades prepared in accordance with the invention, on the other hand, had halos of only about 0.002 inch and hence only about 5 percent of the total particle volume was adversely affected by halo formation.

Subsequent drilling tests with bits fitted with the blades prepared as described above were carried out under controlled conditions in a formation of known stratigraphy. The results of these tests demonstrate the superior properties of the blades prepared by the process of the invention. It was found that the blades hard surfaced by separately heating the carbide particles and alloy and later cooling the mold rapidly to a temperature below the alloy melting point drilled 10,250 feet for each inch of blade wear; while the other set drilled 4,556 feet per inch of blade wear. This marked difference in wear rate confirms the effect of halo formation upon the resistance of hard metal carbides to wear and abrasion and demonstrates that hard surfacing materials prepared in accordance with the invention are superior to those prepared in the conventional manner.

What is claimed is:

1. A process for the manufacture of a hard surfacing material which comprises heating a mass of closely-spaced cemented hard metal carbide particles between about 0.045 and 0.400 inch in size to an infiltration temperature between about 1750° F. and about 2500° F.; separately heating a metallic composition having the ability in the molten state to wet said carbide particles to said infiltration temperature, said composition having a melting point below said infiltration temperature; infiltrating said metallic composition into the interstices between said carbide particles; holding said carbide particles at the infiltration temperature for a period of from about 3 to about 6 minutes; and thereafter rapidly cooling said particles and metallic composition to a temperature below the melting point of said metallic composition before substantial degradation of said particles by said molten metallic composition takes place.

2. A process as defined by claim 1 wherein said hard metal carbide particles are particles of cemented tungsten carbide.

3. A process as defined by claim 1 wherein said metallic composition is a nickel-containing alloy melting between about 1550° F. and about 2400° F.

4. A process as defined by claim 1 wherein said particles and metallic composition are rapidly cooled from said infiltration temperature to a temperature between about 1500° F. and about 1600° F. and are thereafter slowly cooled to room temperature.

5. A process for bonding cemented tungsten carbide particles between about 0.045 and about 0.400 inch in size to the surface of a ferroalloy article which comprises heating said particles in contact with said article in a refractory mold to an infiltration temperature between about 1750° F. and about 2500° F.; separately heating an alloy having the ability in the molten state to wet said tungsten carbide particles to said infiltration temperature, said alloy having a melting point below said infiltration temperature; infiltrating said alloy into the interstices between said tungsten carbide particles and article in said mold; holding said mold at the infiltration temperature for a period of from about 3 to about 6 minutes after said alloy is infiltrated into said interstices; rapidly cooling said mold to a temperature between about 1500° F. and about 1600° F. before substantial halo formation takes place within said particles; and thereafter slowly cooling said mold to room temperature.

6. A process as defined by claim 5 wherein said alloy is a copper-nickel alloy.

7. A process as defined by claim 6 wherein said tungsten carbide particles include cutting elements ranging between about 0.05 and about 0.25 inch in size.

8. A process for the manufacture of a hard surfacing material which comprises heating a mass of closely-spaced cemented tungsten carbide particles between about 0.05 and about 0.25 inch in size, tungsten carbide powder less than about 100 mesh in size, and nickel powder less than about 100 mesh in size to an infiltration temperature between about 1750° F. and about 2500° F.; separately heating an alloy containing copper and nickel to said infiltration temperature, said alloy melting at a temperature below said infiltration temperature between about 1550° F. and about 2400° F.; introducing said alloy into contact with said mass of tungsten carbide particles, tungsten carbide powder and nickel powder at said infiltration temperature; holding said mass and alloy in contact with one another at said infiltration temperature for a period of from about three to six minutes; and thereafter cooling said mass and alloy to a temperature below the melting point of said alloy.

9. A process as defined by claim 8 wherein said alloy is a copper-nickel-tin alloy.

10. A process for preparing a composite material containing particles of tungsten carbide and diamonds which comprises melting a binder alloy in a refractory vessel, said alloy having a melting point in the range between about 1550° F. and about 2400° F. and in the molten state having the ability to wet tungsten carbide; heating a mass of discrete, closely-spaced cemented tungsten carbide particles between about 0.045 and 0.400 inch in size and diamonds in a refractory mold to an infiltration temperature above the melting point of said binder alloy; transferring the molten binder alloy from said refractory vessel into said mold at said infiltration temperature; holding the mold containing said particles, diamonds and molten alloy at the infiltration temperature for a period of from about 3 to about 6 minutes; and thereafter cooling said mold to a temperature below the melting point of said binder alloy.

11. A process for the preparation of a composite material which comprises preparing a mass of discrete tungsten carbide powder granules and closely-spaced particles of cobalt-cemented tungsten carbide between about 0.045 and about 0.400 inch in size in a refractory mold; heating said mold to an infiltration temperature in the range between about 1750° F. and about 2500° F.; heating a metallic binder to said infiltration temperature in a refractory vessel, said binder having a melting point below said infiltration temperature and in the molten state having the ability to wet tungsten carbide; introducing said binder metal from said refractory vessel into said mold at said infiltration temperature; holding the mold containing said binder, granules and particles at the infiltration temperature for a period of from about 3 minutes to about 6 minutes; and thereafter cooling said mold to a temperature below the melting point of said binder metal.

12. A process as defined by claim 11 wherein said binder metal is a nickel alloy.

13. A process as defined by claim 11 wherein said binder metal is an iron alloy.

References Cited by the Examiner

UNITED STATES PATENTS

| | | | |
|---|---|---|---|
| 2,283,219 | 5/42 | McCullough | 22—204 XR |
| 2,828,226 | 3/58 | Goetzel | 22—202 XR |

FOREIGN PATENTS

| | | |
|---|---|---|
| 764,510 | 7/53 | Germany. |
| 891,324 | 9/53 | Germany. |

OTHER REFERENCES

Pages 60, 65, and 207, March 28, 1960, Cemented Carbides, by Schwartzkopf and Kiefer.

MICHAEL V. BRINDISI, *Primary Examiner.*

MARCUS U. LYONS, *Examiner.*